Sept. 12, 1944. G. A. GOESSLING 2,357,950
PROCESS OF MAKING METAL-COATED PLASTIC ARTICLES
Filed Aug. 5, 1943
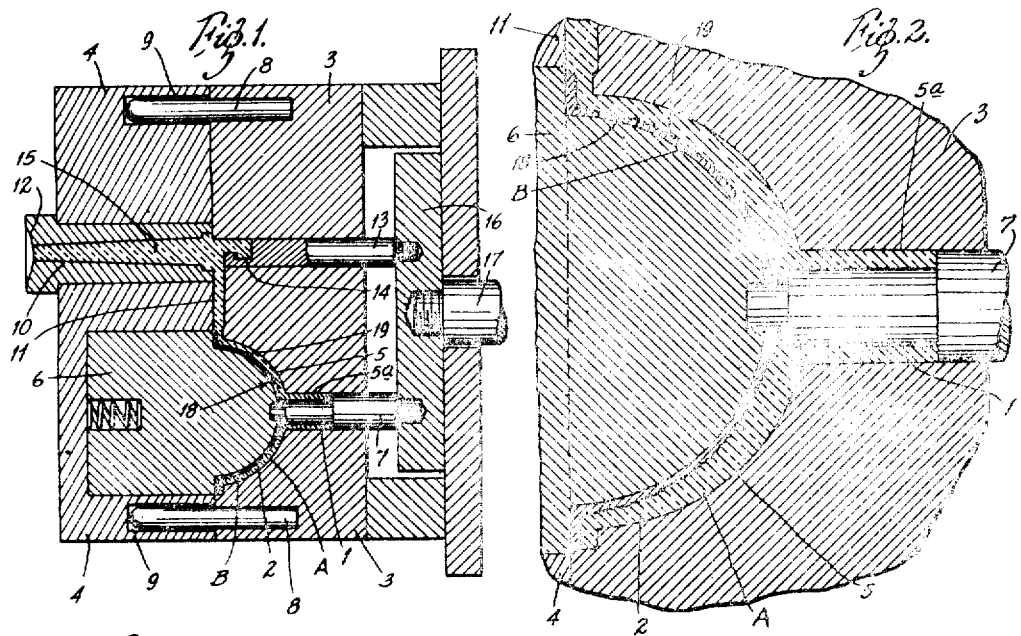
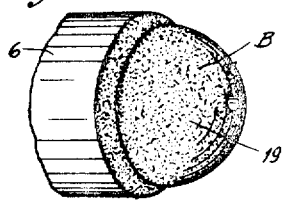
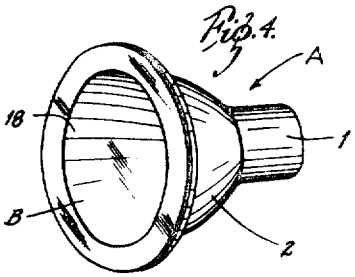
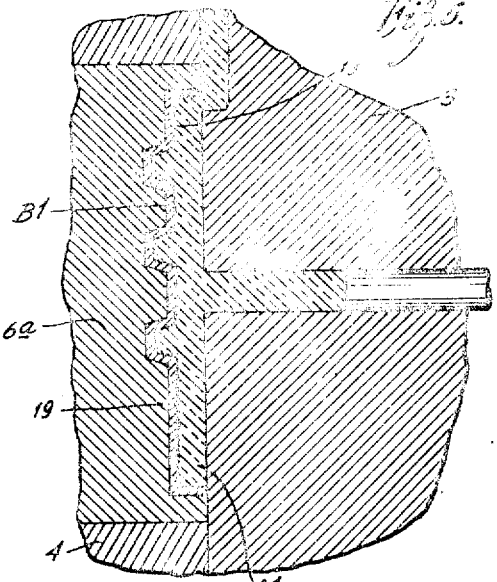
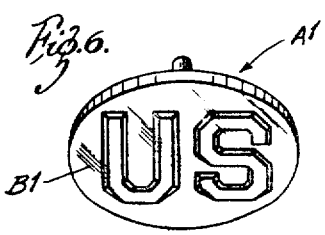
INVENTOR:
Gerald A. Goessling
HIS ATTORNEYS.

Patented Sept. 12, 1944

2,357,950

UNITED STATES PATENT OFFICE 2,357,950

PROCESS OF MAKING METAL-COATED PLASTIC ARTICLES

Gerald A. Goessling, Richmond Heights, Mo.

Application August 5, 1943, Serial No. 497,522

3 Claims. (Cl. 18—59)

This invention relates to the manufacture of plastic articles with metal-coated surfaces. Its principal objects are to provide for application of the metal coating to the plastic body during the molding thereof in a conventional mold or die; to provide a firm bond between the metal coating and the plastic body; to reduce the cost and increase the speed of production of such articles; to provide for the application of the metal coating to plane, convex, concave or irregular surfaces on the exterior and/or interior surfaces of the plastic article; and to vary the exterior finish of the applied metal coating. The invention consists principally in spraying or otherwise applying a coating of metal or metal alloy over that portion of the mold cavity which gives shape to the surface of the plastic article that is to be molded in said cavity, and then molding the heat softened plastic material in the metal-coated mold cavity by the usual injection or compression molding process whereby the metal coating initially applied to the surface of the die cavity is firmly bonded to the plastic article molded therein and is readily stripped from the mold cavity when the article molded therein is removed therefrom.

In the accompanying drawing, which forms part of this specification and wherein like symbols refer to like parts wherever they occur, Fig. 1 is a central longitudinal section through the mold for the injection molding of a plastic flashlight reflector, showing the removable arbor, which forms the inner surface of the bell-shaped end of the reflector, provided with a metal coating which is bonded to the plastic article during the process of molding the same and constitutes the reflecting surface thereof, Fig. 2 is an enlarged fragmentary section similar to Fig. 1, Fig. 3 is a fragmentary perspective view showing the arbor removed from the mold and the spray-metal coating applied thereto, Fig. 4 is a perspective view of the finished, metal-coated plastic reflector, Fig. 5 is a fragmentary section, similar to Fig. 2, showing a mold for forming a plastic button or the like having raised characters on one surface thereof, with the mold element for forming said surface being shown coated with spray-metal which is bonded to said surface during the process of molding said plastic button; and Fig. 6 is a perspective view of the metal covered initialed button.

In Figs. 1 to 4 of the accompanying drawing, my invention is shown embodied in a molded plastic flashlight reflector A having a tubular stem end 1 for the base of an electric lamp (not shown) and a bell end 2 for the bulb of said lamp. As shown in Fig. 1, the mold in which the plastic reflector A is formed comprises two relatively movable sections or members 3 and 4, respectively. The mold section 3 has a semi-spherical recess 5 with a bore 5a at the bottom thereof that form the outer surface of the reflector A; and the mold section 4 has a spring-projected plunger or arbor 6 removably mounted therein in alinement with the recess 5 and forming the interior surface of the bell end 2 of said reflector. The interior surface of the stem end 1 of the reflector A is formed by a core pin 7 which works in the bore 5a that extends through the mold section and opens into the recess 5 therein in axial alinement with the latter. Thus, the recess 5 and bore 5a of the mold section 3 and the plunger or arbor 6 of the mold section 4 cooperate to form a mold cavity. The mold section 3 has guide pins 8 anchored therein that project into recesses 9 provided therefor in the mold section 4 when the two mold sections are brought together.

The mold section 4 is provided at one side of the plunger or arbor 6 carried thereby with a sprue bushing 10 which opens at its inner end into one side of the mold cavity 5 through a runner 11 and terminates at its outer or exposed end in a cup-shaped portion 12 adapted to receive a nozzle (not shown) for injecting plastic molding material under pressure through said sprue bushing and runner into said mold cavity. The mold section 3 has a pin 13 slidably mounted therein in axial alinement with the sprue bushing 10, said pin having a notch 14 in its end that communicates with the inner end of said bushing so as to form a grip for pulling the sprue material 15 free from the sprue bushing when the two mold sections are separated. The sprue puller 14 and core pin 7 are fixed to an injector plate 16 that is mounted on an axially movable plunger 17, whereby said sprue puller and core are movable relative to the mold section 3 to eject the molded reflector therefrom.

The hereinbefore described mold may vary in the number and arrangement of parts and in its opening and closing movement, depending on the shape and number of plastic articles that are to be molded and whether the injection or compression molding process is employed.

A light reflecting metal coating B is incorporated in the bell end 2 of the plastic reflector A during the molding thereof. According to the present invention, the plunger or arbor 6 is removed from the mold section 4 and a metal or metal alloy coating B is applied to the spherically convex shaping surface thereof in a molten state preferably by means of a suitable spray gun (not shown). The spray-metal coating B adheres lightly to the arbor 6 and the arbor engaging surface 18 of said coating takes the shape and finish of the arbor surface. The exposed or outer surface 19 of the coating B, however, is of coarse, granular structure, due to the spray gun application of the molten metal on the arbor 6.

The metalized or metal-coated arbor 6 is then mounted in the mold section 4, after which the mold is closed and fluid plastic molding material injected into the mold cavity in accordance with the usual injection molding process. During the molding operation, the molding material is forced under high pressure against the coarse granular surface 19 of the spray metal coating B on the arbor 6, thus bonding said coating firmly in the bell end 2 of the plastic reflector when the same hardens. The mold is then opened and the plastic reflector A with the metal coating B firmly bonded thereto is removed from the mold in the usual manner.

On the plastic reflector A shown and described the exposed surface 18 of the metal coating B constitutes the light reflecting element and must necessarily have a smooth, shiny or specular finish for directional reflection. This finish is imparted to the coating by giving a high, mirror-like polish to the arbor surface on which the metal coating B is originally deposited, whereby the surface 18 of the metal coating or shell that engages the polished surface of the arbor has a finish comparable to the polished surface. However, the metal coating receiving surface of the arbor may be provided with different finishes to provide moderately directional or diffused reflection. With rough finishes, any tendency of the spray-metal coating to cling to the mold or die surface is prevented by polishing or buffing the same or by applying a fine coating of thin oil over the die surface.

If desired, the coating material may comprise fine particles, such as aluminum powder or essence pearl incorporated in a vehicle of lacquer to impart ornamental finishes and surfaces to molded articles made of a cheaper quality of plastic material. The coating may also be made of non-metallic material. Metal inlays or raised designs can be obtained by masking portions of the die surface or by removing portions of the metal coatings sprayed thereon. In cases where transparent plastics are desired, the metal coating can be applied in the manner hereinbefore described and then, by a double molding operation, the metal coating may itself be coated with a protective coating of clear transparent plastic.

Fig. 6 illustrates a plastic button A¹ having an initialed metallic covering B¹ applied thereto in accordance with the process hereinbefore described. As shown in Fig. 5, an arbor or plunger 6a is removably mounted in the die member 4 and has its polished forming end with the raised characters thereon covered with the spray-metal coating B¹. This embossed metal coating is bonded to the plastic button when the fluid plastic is forced against the coarse outer surface 19 of said coating during the injection molding process, whereby the metal coating may be stripped from the polished surface of the arbor when the mold is opened and the button removed therefrom. During the molding operation, the pressure of the fluid plastic against the metal coated portion of the die cavity has a tendency to iron out the latter and cause it to conform closely to the surface upon which it is originally deposited. The contour or finish of the working surface of the plunger or die may be varied to give any desired shape, design or finish to the exposed surface of the metal coating on the plastic article.

What I claim is:

1. The process of making a molded metal covered plastic article in a mold having a removable element forming a portion of the mold cavity of said mold which consists in applying a coating of spray metal to the mold cavity forming portion of said element in the removed position thereof, mounting said element in operative position in said mold, and then molding said article under pressure in said mold, whereby said coating is bonded to said article and is detached from said element when the said article is removed.

2. The process of making a c... d plastic article in an injection molding machine having a mold including cooperating mold cavity forming members which consists in providing one of said members with a cavity forming element that is detachable therefrom for complete removal from said machine, applying a coating to the mold cavity surface of said detachable element in the removed position thereof, attaching said coated element to said mold cavity forming member, and then injecting fluid plastic molding material under pressure into the closed mold to mold said article therein, whereby said coating is bonded to said article during the injection molding thereof and is detachable from said element when said article is removed from said mold.

3. The process of making a metal covered plastic article in an injection molding machine having a mold including cooperating mold cavity forming members which consists in providing one of said members with a cavity forming element that is detachable therefrom for complete removal from said machine, applying a coating of spray metal to the mold cavity surface of said detachable element in the removed position thereof, attaching said metal coated element to said mold cavity forming member, and then injecting fluid plastic molding material under pressure into said mold to mold said article therein, whereby said metal coating is bonded to said article during the injection molding thereof and is detachable from said element when said article is removed from said mold.

GERALD A. GOESSLING.